(No Model.)

C. A. GILMAN.
CUTTER HEAD FOR BOOT AND SHOE EDGE TRIMMING MACHINES.

No. 321,357. Patented June 30, 1885.

WITNESSES.
C. S. Jackson
S. R. Burton

INVENTOR
Charles A. Gilman
By Chas. H. Burleigh
Attorney

UNITED STATES PATENT OFFICE.

CHARLES A. GILMAN, OF LYNN, MASSACHUSETTS, ASSIGNOR, BY DIRECT AND MESNE ASSIGNMENTS, TO THE NEW ENTERPRISE EDGE TRIMMER COMPANY, OF PORTLAND, MAINE.

CUTTER-HEAD FOR BOOT AND SHOE EDGE TRIMMING MACHINES.

SPECIFICATION forming part of Letters Patent No. 321,357, dated June 30, 1885.

Application filed February 27, 1885. (No model.)

*To all whom it may concern:*

Be it known that I, CHARLES A. GILMAN, a citizen of the United States, residing at Lynn, in the county of Essex and State of Massachusetts, have invented certain new and useful Improvements in Cutter-Heads for Boot and Shoe Edge Trimming Machines; and I declare the following to be a description of my said invention, sufficiently full, clear, and exact to enable others skilled in the art to which it appertains to make and use the same, reference being had to the accompanying drawings, which form a part of this specification.

The object of my present invention is to provide a cutter for trimming the edges of boots and shoes that will cut easily and rapidly, give a smooth finish to the edges, and allow free clearance for the chips or shavings, so as not to become clogged while at work. This object I attain by a cutter constructed as herein shown and described.

Figure 1:
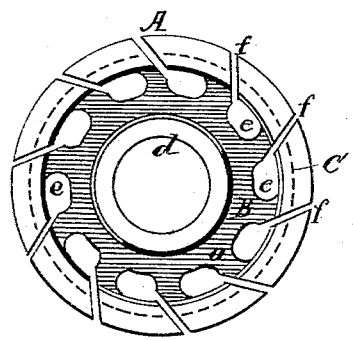
Figure 2:
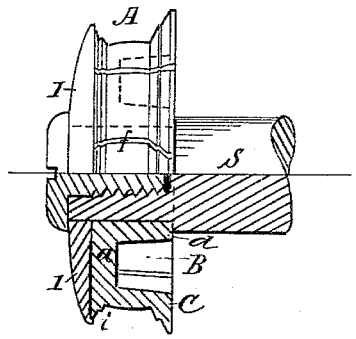
Figure 3:
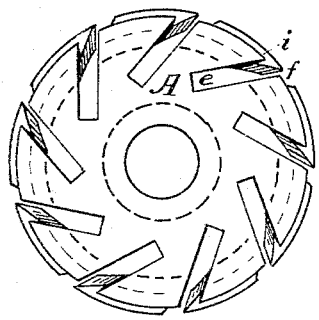
Figure 4:
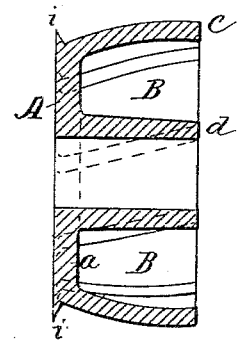
Figure 5:
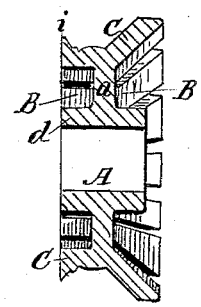

In the drawings, Figure 1 is a rear view of my improved cutter-head. Fig. 2 is a part side-section view of the same, showing the cutter combined with the arbor and guard-plate of the trimming machine. Fig. 3 is a view of a cutter-head adapted for heel edges. Fig. 4 is a sectional view of the same; and Fig. 5 is a sectional view of a cutter of modified form, having recesses on both sides.

My improved cutter is formed from a single solid piece of steel, A, the peripheral face of which is turned off and finished in proper shape to correspond with the desired form to be imparted to the edge of the boot or shoe, accordingly as it is to be used for the fore part or heel edges, or for different styles or classes of work. The cutter is made about two inches, more or less, in diameter. The side of the piece or disk is hollowed out or recessed with an annular groove or cavity, B, leaving a central hub, $d$, and a thin flange or rim, C, about the circumference, the latter being connected with the hub $d$ by a thin plate or disk, $a$, of sufficient strength to support the cutting-edges. The cavity B is preferably formed at the rear side, but may, if desired, be formed at the front; or in some cases both sides may be recessed, as illustrated in Fig. 5.

The overhanging rim C is slotted by means of a suitable saw or milling-tool, the slots being cut through the rim or flange C into openings, $e$, formed through the disk $a$ at such degree of inclination in relation to the peripheral surface as will form a series of cutting-edges, $f$, having the capacity for giving a smooth drawing cut as the head $a$ is revolved in contact with the leather. Said slots may be made straight, as in Figs. 1 and 2, or diagonal, as in Figs. 3 and 4.

By making the cutter cup-shaped or recessed, as at B, a free clearance for the fine chips and shavings is afforded as they are cut from the edges, and spaces in front of the cutting-edges $f$ do not become clogged when the tool is in operation.

A feather-edge trimming-flange, with cutting-points $i$, may be formed on the rim C at the front, as indicated, or the cutter may be made without said feather-edge trimmer, if required.

The cutter is mounted for use on the end of a revolving-shaft or arbor, S, and a guard plate or disk, I, is placed on the front end to prevent contact of the cutter with the upper of the boot or shoe. I do not, however, herein claim the use of a guard-plate with a trimming-cutter.

The slots in the rim C may be formed diagonally across the face, as indicated in Figs. 3 and 4, if desired.

What I claim as of my invention, and desire to secure by Letters Patent, is—

1. A cutter for boot and shoe edge trimming machines, formed of a single piece of steel, and having an annular recess, B, in the side thereof, and an overhanging rim, C, said rim being slotted through in the manner shown to form cutting-edges $f$, as hereinbefore set forth.

2. The cutter-head, formed as described, with the hub $d$, the disk $a$, the overhanging slotted rim, and the feather-edge cutter $i$, disposed in the manner shown and for the purpose set forth.

Witness my hand this 19th day of February, A. D. 1885.

CHARLES A. GILMAN.

Witnesses:
CHAS. H. BURLEIGH,
W. C. YOUNG.